Feb. 18, 1958                      C. F. FITTER                      2,823,579
                             CONTINUOUS OPTICAL COPIER
                              Filed March 29, 1955
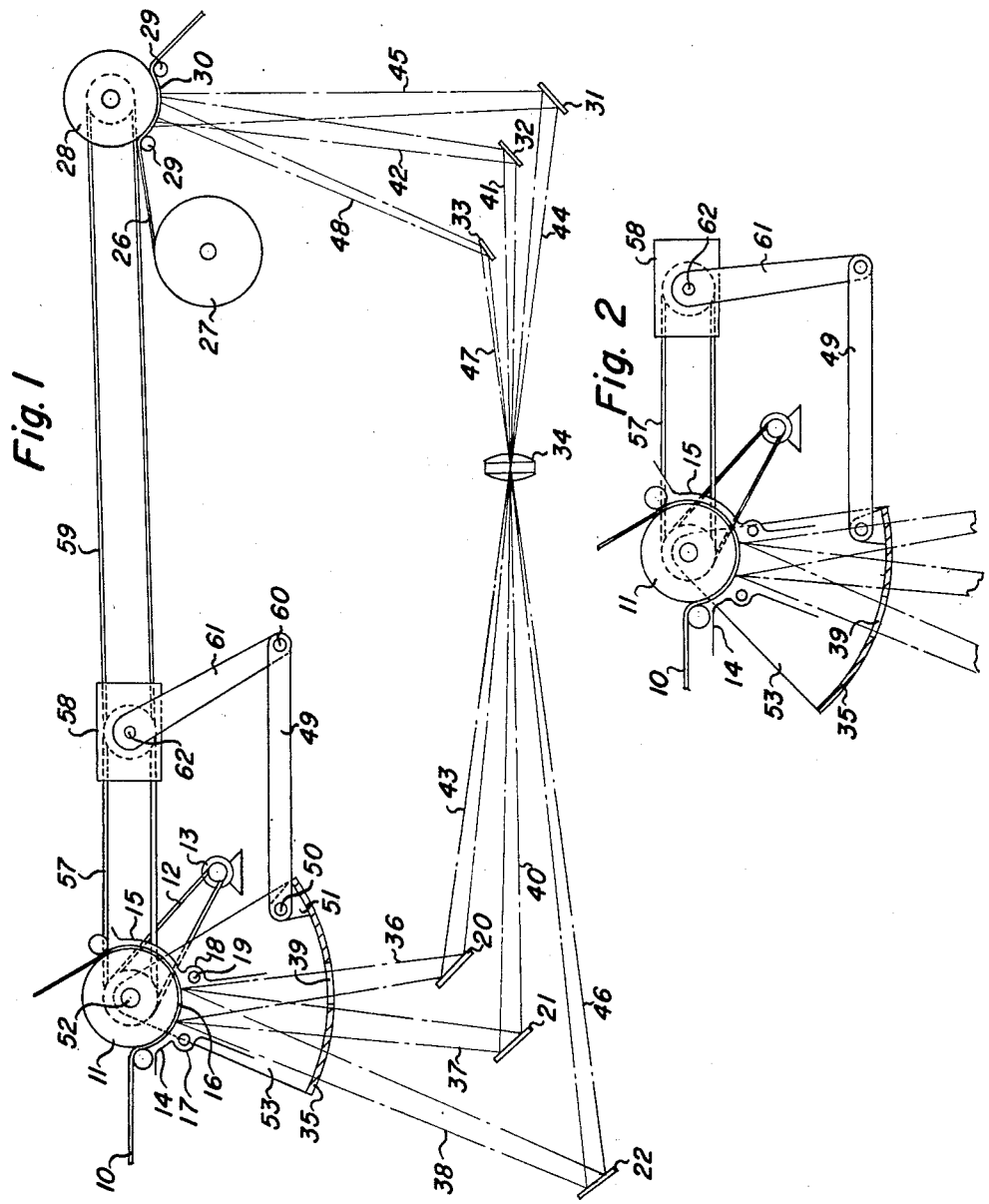
CHARLES F. FITTER
    INVENTOR.
BY Daniel I. Mayne
   J. Griffin Littel
              ATTORNEYS United States Patent Office 2,823,579
Patented Feb. 18, 1958

2,823,579

CONTINUOUS OPTICAL COPIER

Charles F. Fitter, Rochester, N. Y., assignor to Eastman Kodak Company, Rochester, N. Y., a corporation of New Jersey Application March 29, 1955, Serial No. 497,637

16 Claims. (Cl. 88—24)

The present invention relates to a photographic apparatus, and more particularly to a continuous optical copier.

The present invention relates to an optical copying system designed to provide several discrete magnifications of the original or copy and without the necessity of moving the object or copy plane, the image plane or the lens position. In the preferred embodiment shown, the system is used in conjunction with a "flow" type of drawing or document-copying camera in which a long opaque document is driven or moved past a projection slit or projection station where it is suitably illuminated by reflected light, and the slit image of the desired magnification is directed to an image receiving station where the image is recorded on a sensitized strip which is moved past the image receiving station. Several folded light paths are provided between the stations so as to provide the desired degree of magnification of the image at the image station. A suitably movable baffle is positionable to select the proper light path to secure the desired image magnification. The drive means for the strip at the image station is controlled and varied so that the strip is moved in proper relation to the copy and the selected magnification.

The principal object of the invention is the provision of an optical copying system in which the light paths are folded by fixed mirrors in such a way that different path lengths are achieved, as required for different magnifications, by proper placement of the mirrors.

A further object of the invention is the provision of means for selecting individually the desired light path corresponding to the desired magnification.

Yet another object of the invention is the provision of an arrangement for controlling the relative speeds of the copy and sensitized strips from the light path selecting means so that the strips will be moved at the proper relative speeds corresponding to the degree of magnification selected.

A still further object of the invention is the provision of a single projection lens which is common to all of the light paths.

And another object of the invention is the provision of a mechanism of the type described which comprises few parts of rugged construction, easy to operate, simple and highly effective in use.

To these and other ends the invention resides in certain improvements and combinations of parts, all as will be hereinafter more fully described, the novel features being pointed out in the claims at the end of the specification.

In the drawings:

Fig. 1 is a partial view of a continuous copier or printer constructed in accordance with the preferred embodiment of the present invention, showing the arrangement of the different light paths, and the shutter or light baffle in the position to select one light path.

Fig. 2 is a view of a portion of the apparatus illustrated in Fig. 1, showing the baffle or shutter position to select another light path.

The same reference numerals throughout the different views indicate the same parts.

Fig. 1 shows a folded optical system used in connection with a flow-type copying camera. The opaque copy 10, which may be any suitable length, and has images spaced thereon, is fed around a cylinder 11 which is connected by means of a belt or chain drive 12 to a motor 13 which rotates cylinder 11 at a constant speed. A pair of baffle plates 14 and 15 are positioned on opposite sides and below the cylinder 11 to form a projection slit or station 16 over which the copy 10 is moved, as is deemed apparent. The baffles 14 and 15 are formed with recesses 17 and 18 in which are positioned lamps 19 which illuminate the images in the slit 16 by means of reflected light. If the copy 10 is of a transparent nature, the illuminating means may be positioned within the cylinder 11. Three mirrors 20, 21 and 22 are positioned in offset relation below and different distances from but in optical alignment with the light slit 16.

A sensitized strip 26 is unwound from a roll 27 and is passed over an arc of a rotating cylinder 28 and is held thereagainst by means of a pair of guide rolls 29. The portion of the cylinder 28 between rolls 29 may be considered broadly as an image receiving station 30 to which the projected images of copy 10 are directed. Three mirrors 31, 32, 33 are positioned in offset relation below and different distances from but in optical alignment with the image station 30. The mirrors 31, 32 and 33 cooperate with the mirrors 20, 21 and 22 to provide three separate and distinct folded light paths between the light slit 16 and the image receiving station 30, each light path passing through a fixed projection lens 34 which is positioned between and in optical alignment with the two groups of mirrors so the lens 34 is common to all three light paths.

Because of the positions of the various mirrors, the lengths of the light paths vary in length so that the magnification or size of the image at the station 30 will depend upon the particular light path selected. As is apparent, only one light path at a time can be used so as to eliminate unwanted images at the station 30. In order to select the desired light path, a movable shutter is positioned to block out all but one light path. To secure this result, an arcuate shaped shutter or baffle 35 is movable across the portions 36, 37 and 38 of the three light paths between the slit 16 and the mirrors 20, 21 and 22. This baffle 35 is provided with a single aperture or slit 39 of such size as to permit the passage of only one of the light portions 36, 37 or 38, as shown in Fig. 1.

If it is desired to make the image 30 of the same size as the copy (1:1), the baffle 39 is moved to the left from the position shown in Fig. 1 to uncover the portion 37 and to cover portions 36 and 38 of the other two light paths. Then the light travels from slit 16 over portion 37 to mirror 21, path 40 to projection lens 34 then over path 41 to mirror 32 which reflects the image over the path 42 to station 30 to provide an image at station 30 of the same size as the image on the copy 10. However, if an enlarged image at station 30 is desired, the baffle 35 is moved to the position shown in Fig. 1 to uncover portion 36 of the light path between slit 16 and mirror 20. The latter then reflects the image over path 43 to lens 34 which then directs the image over path 44 to mirror 31 which reflects the image over path 45 to provide an enlarged image at station 30. Finally, if a reduced image at station 30 is desired, the baffle 33 is moved all the way to the left as shown in Fig. 2 to uncover light path 38. The image at slit 16 is then projected to mirror 22 which reflects the image over path 46 to lens 34 which projects the image along path 47 to mirror 33 which then projects the reduced image along path 48 to station 30. Thus, three separate and distinct light paths are provided between the projection slit 16 and the image station 30, and by selecting the proper paths, by positioning baffle 35, an image of the proper magnification can be obtained at station 30. Also, these various light paths are folded by means of two groups of mirrors positioned on opposite sides of the projection lens 34.

The baffle 34 can be shifted to select any of its positions of adjustment by means of a lever 49 one end of which is pivoted at 50 to an ear or lug 51 carried by the baffle 35, which is preferably arcuate in shape and is movable about the center of cylinder 11 as an axis. In order to support the baffle 35, the latter is provided at one or both ends with an upwardly extending sector shape plate 53 which is rockably mounted for movement about shaft 52 of cylinder 11, so that the shutter 35 wil move concentrically about shaft 52, as shown in the drawings.

It is apparent that as the degree of magnification is varied, the speed of rotation of cylinder 28, and hence the lineal speed of the strip 26, must be varied relative to the speed of the cylinder 11. The relative speeds of the cylinders 11 and 28 will depend, of course, on the degree of magnification. While these two cylinders may be separately driven and controlled, it is preferred to drive both cylinders from a common source and then vary the relative speed of cylinder 28 with respect to the degree of magnification, the cylinder 11 being driven at a constant speed. To secure this result, the electric motor 13, or other suitable prime mover, is connected by a belt or chain to drive 12 to cylinder 11 to rotate the latter at a constant and uniform speed. To obtain speed variations of cylinder 28, cylinder 11 is connected by a belt or chain to drive 57 to a gear box or speed changer 58 which, in turn, is connected by a chain or belt to drive 59 to cylinder 28. This gear box 58 will vary the speed of the cylinder 28 relative to the cylinder 11. As the gear box or speed changer 58 may be of any standard or suitable construction, and forms no part of the present invention, details thereof are not shown or described. Suffice it to say, that with a constant speed of rotation of cylinder 11, the gear box 58 may be adjusted to drive the cylinder 28 at a speed which is the same, slower or faster than the speed of cylinder 11 depending upon the degree of magnification selected. The gear box 58 may be adjusted manually or in any other suitable manner. However, it is desired to utilize the movement of the baffle 35 to control the adjustment of the gear box 58 and the latter will be moved accurately and automatically upon movement of the baffle in accordance with the selected magnification. To this end, the right end 60 of lever 49 has pivotally connected thereto one end of a lever 61 the other end of which is connected to shaft 62 of the gear box. Thus, the shutter 35 is connected directly to the shaft 62 of the gear box 58 so that any adjustment or movement of the shutter will simultaneously adjust the gear box to vary the drive thereof to alter the speed of the cylinder 28 in accordance with the selected magnification, the advantages of which are deemed apparent. Thus, cylinder 28 is driven from cylinder 11 and the speed of rotation of cylinder 28 is adjusted by means of movement of the shutter 35 in accordance with the magnification of the image at slit 30.

Thus, the present invention provides an optical copying system provided with three separate and distinct folded light paths so as to secure the desired magnification of the projection image. A single movable baffle enables the particular light path to be easily and quickly selected, and the selection of the particular light path simultaneously and automatically adjusts the speed of movement of the sensitized strip at the image station in accordance with the degree of magnification selected. A single projection lens is positioned in and is common to all three light paths. The particular degrees of magnifications shown and described are for illustrative purposes only as it is contemplated that other magnifications may be obtained. Such degrees of magnifications may be accomplished by relative positions of the mirrors of the two groups relative to the projection slit 16 and image receiving station 30. Also, while the present embodiment of the invention shows a copier 10 and a sensitive member 26 in the form of long strips or webs, the folded light paths could be used just as effectively if the copier and the sensitive member were in the form of individual image areas of proper relative sizes. In the case of the single image area, obviously no drive means need be provided.

While one embodiment of the invention has been disclosed, it is to be understood that the inventive idea may be carried out in a number of ways. This application is, therefore, not to be limited to the precise details described but is intended to cover all variations and modifications thereof falling within the scope of the appended claims.

What I claim and desire to secure by Letters Patent of the United States is:

1. A projection printing apparatus for projecting images of copy comprising, in combination, a projection station over which said copy is moved, means to illuminate said images successively at said station, an image receiving station spaced from said means and under which a sensitized strip is moved to receive projected images of said copy, a plurality of light paths between said means and said station to project the images of said copy at different magnifications to said station, and means for selecting one of said paths to secure an image of a desired magnification at said station.

2. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnifications to said image receiving station, and an adjustable selector for selecting only one of said paths to provide an image of the desired magnification at said image receiving station.

3. A projection printing apparatus for projecting images of copy comprising, in combination, an image projecting station over which the images of said copy are moved successfully, means to illuminate individual images at said station, a single image receiving station positioned a fixed distance from said projecting station and over which a sensitized strip is moved to receive images from said first station, a plurality of light paths of different lengths optically connecting said stations to project said images at different magnifications to said image receiving station, and an adjustable baffle for blocking off all but one of said paths so as to project only an image of the desired magnification to said image receiving station.

4. A projection printing apparatus for projecting images of copy comprising, in combination, an image projecting station over which the images of said copy are moved successively, means to illuminate individual images at said station, a single image receiving station positioned a fixed distance from said projecting station and over which a sensitized strip is moved to receive images from said first station, a plurality of light paths of different lengths optically connecting said stations to project said images at different magnifications to said image receiving station, an adjustable baffle for blocking off all but one of said paths so as to project only an image of the desired magnification to said image receiving station, and means for moving said copy and said strip over said stations in relation to the degree of magnification of said image.

5. A projection printing apparatus for projecting images of copy comprising, in combination, an image projecting station over which the images of said copy are moved successively, means to illuminate individual images at said station, a single image receiving station positioned a fixed distance from said projecting station and over which a sensitized strip is moved to receive images from said first station, a plurality of light paths of different lengths optically connecting said stations to project said images at different magnifications to said image receiving station, an adjustable baffle for blocking off all but one of said paths so as to project only an image of the desired magnification to said image receiving station, means for moving said copy and said strip over said stations in relation to the degree of magnification of said image, and means controlled by said baffle for controlling the relative speeds of movement of said copy and said strip.

6. A projection printing apparatus for projecting images of copy comprising, in combination, a member formed with a projection slit over which said copy is moved, means to illuminate said copy at said slit, an image receiving station spaced from said slit and under which a sensitized strip is moved to receive projected images, means providing a plurality of light paths of different lengths between said slit and said station to project images of different magnifications to said station, means for selecting one of said paths, and a single projection lens common to all of said paths.

7. A projection printing apparatus for projecting images of copy comprising, in combination, a member formed with a projection slit over which said copy is moved, means to illuminate said copy at said slit, an image receiving station spaced from said slit and under which a sensitized strip is moved to receive projected images, means providing a plurality of light paths of different lengths between said slit and said station to project images of different magnifications to said station, and a fixed projection lens positioned in and common to all of said paths, the light path on opposite sides of the lens being separate and independent.

8. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnifications to said image receiving station, a plurality of reflecting members spaced different distances from said projecting station, a plurality of reflecting members independent of said first members and spaced different distances from said image receiving station and adapted to receive images from said first reflecting means and to direct said reflected images to said image receiving station, said reflecting means providing light paths of different lengths between said stations to provide images of different magnification at said image receiving station, and means between said projection station and said first reflecting means to direct the image of said copy over only one of said paths to provide an image at said image station of the desired magnification.

9. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnifications to said image receiving station, a plurality of reflecting members spaced different distances from said projecting station, a plurality of reflecting members independent of said first members and spaced different distances from said image receiving station and adapted to receive images from said first reflecting means and to direct said reflected images to said image receiving station, said reflecting means providing light paths of different lengths between said stations to provide images of different magnification at said image receiving station, means between said projection station and said first reflecting means to direct the image of said copy over only one of said paths to provide an image at said image station of the desired magnification, and a single projection lens positioned between said first and second reflecting means and common to all of said paths.

10. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnification to said image receiving station, each of said paths comprising a pair of reflecting mirrors to reflect the image of a definite magnification from said projecting station to said image receiving station, and an adjustable baffle movable across said paths to select one of said paths to provide an image of a desired magnification at said image station.

11. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnification to said image receiving station, each of said paths comprising a pair of reflecting mirrors to reflect the image of a definite magnification from said projecting station to said image receiving station, an adjustable baffle movable across said paths to select one of said paths to provide an image of a desired magnification at said image station, and a single fixed projection lens positioned between said pairs of mirrors and common to all of said paths.

12. A projection printing apparatus for projecting images of copy comprising, in combination, an image projecting station over which the images of said copy are moved successively, means to illuminate individual images at said station, a single image receiving station positioned a fixed distance from said projecting station and over which a sensitized strip is moved to receive images from said first station, a plurality of light paths of different lengths optically connecting said stations to project said images at different magnifications to said image receiving station, an adjustable baffle for blocking off all but one of said paths so as to project only an image of the desired magnification to said image receiving station, means for moving said copy and said strip over said stations in relation to the degree of magnification of said image, means controlled by said baffle for controlling the relative speeds of movement of said copy and said strip, and a fixed projection lens positioned in and common to all of said paths.

13. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnifications to said image receiving station, a plurality of reflecting members spaced different distances from said projecting station, a plurality of reflecting members independent of said first members and spaced different distances from said image receiving station and adapted to receive images from said first reflecting means and to direct said reflected images to said image receiving station, said reflecting means providing light paths of different lengths between said stations to provide images of different magnification at said image receiving station, means between said projection station and said first reflecting means to direct the image of said copy over only one of said paths to provide an image at said image station of the desired magnification, means to move said copy and said strip over said projection and image stations respectively, and means controlled by said directing means for controlling the moving means to move the copy and strip at proper relative speeds.

14. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnifications to said image receiving station, a plurality of reflecting members spaced different distances from said projecting station, a plurality of reflecting members independent of said first members and spaced different distances from said image receiving station and adapted to receive images from said first reflecting means and to direct said reflected images to said image receiving station, said reflecting means providing light paths of different lengths between said stations to provide images of different magnification at said image receiving station, means between said projection station ad said first reflecting means to direct the image of said copy over only one of said paths to provide an image at said image station of the desired magnification, means to move the copy over said projection station at a constant speed, means to move said strip over said image station, means including a variable means to connect said last moving means to said first moving means to move said strip in a definite relation to said copy, and means controlled by said direction means for adjusting said variable means to adjust the speed of movement of said strip relative to the movement of said copy.

15. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of light paths of different lengths between and optically connecting said stations to project images of different magnifications to said image receiving station, a plurality of reflecting members spaced different distances from said projecting station, a plurality of reflecting members independent of said first members and spaced different distances from said image receiving station and adapted to receive images from said first reflecting means and to direct said reflected images to said image receiving station, said reflecting means providing light paths of different lengths between said stations to provide images of different magnification at said image receiving station, means between said projection station and said first reflecting means to direct the image of said copy over only one of said paths to provide an image at said image station of the desired magnification, means to move said copy and said strip over said projection and image stations respectively, means controlled by said directing means for controlling the moving means to move the copy and strip at proper relative speeds, and a projection lens positioned between said first and second reflecting members and common to all of said paths to direct the images from said first reflecting members to said second reflecting members.

16. A projection printing apparatus for projecting images of copy comprising, in combination, an image projecting station over which the images of said copy are moved successively, means to illuminate individual images at said station, an image receiving station positioned a fixed distance from said projecting station and over which a sensitized strip is moved to receive the images from said first station, a plurality of reflecting members spaced different distances from said projecting station, a plurality of reflecting members independent of said first members and spaced different distances from said image receiving station and adapted to receive images from said first reflecting means and to direct said reflected images to said image receiving station, said reflecting means providing light paths of different lengths between said stations to provide images of different magnification at said image receiving station, means between said projection station and said first reflecting means to direct the image of said copy over only one of said paths to provide an image at said image station of the desired magnification, means to move the copy over said projection station at a constant speed, means to move said strip over said image station, means including a variable means to connect said last moving means to said first moving means to move said strip in a definite relation to said copy, means controlled by said direction means for adjusting said variable means to adjust the speed of movement of said strip relative to the movement of said copy, and a single projection lens common to all of said paths and positioned between said first and said second reflecting members.

References Cited in the file of this patent

UNITED STATES PATENTS

| | | |
|---|---|---|
| 2,045,119 | Carpenter | June 23, 1936 |
| 2,055,118 | Carpenter | Sept. 22, 1936 |
| 2,367,673 | Fassel | Jan. 23, 1945 |